United States Patent
Chen et al.

[11] Patent Number: 6,055,580
[45] Date of Patent: Apr. 25, 2000

[54] SYSTEM FOR TRANSFERRING LENGTH ROUND DOWN TO CACHE LINE MULTIPLE CAPABLE TO DETERMINE TYPE OF READ REQUEST WHICH SELECTS AND READS PORTION OF PREFETCHED DATA IN MEMORY

[75] Inventors: Edmund Chen, Sunnyvale; Claude Hayek, Mountain View; Jahan Lotfi, Fremont, all of Calif.

[73] Assignee: 3COM Corporation, Santa Clara, Calif.

[21] Appl. No.: 09/087,347

[22] Filed: May 29, 1998

[51] Int. Cl.⁷ .................................................. G06F 13/00
[52] U.S. Cl. .................................. 710/5; 710/5; 710/33; 712/205; 712/207
[58] Field of Search .................................. 710/5, 129, 33; 711/3, 201; 712/207, 205

[56] References Cited

U.S. PATENT DOCUMENTS

| | | | |
|---|---|---|---|
| 4,371,924 | 2/1983 | Schaefer | 364/200 |
| 5,146,578 | 9/1992 | Zangenehpour | 395/425 |
| 5,634,025 | 5/1997 | Breternitz, Jr. | 712/207 |
| 5,640,544 | 6/1997 | Onodera et al. | 395/509 |
| 5,721,865 | 2/1998 | Shintani et al. | 395/464 |
| 5,787,475 | 7/1998 | Pawlowski | 711/137 |
| 5,812,774 | 9/1998 | Kempf et al. | 395/200.42 |
| 5,974,497 | 10/1999 | Teshome | 710/129 |

Primary Examiner—Thomas C. Lee
Assistant Examiner—Chun Cao
Attorney, Agent, or Firm—Wagner, Murabito & Hao LLP

[57] ABSTRACT

A method and system for efficiently transferring data between a host computer and a peripheral component which is removably coupled to the host computer. In one embodiment of the present invention, a peripheral component such as, for example, a network interface card receives information from a peripheral component driver, such as, for example, a network interface card driver. In this embodiment, the information triggers the peripheral component to transmit a read request to the host computer such that the peripheral component can access data present at the host computer. Next, the peripheral component determines from the information received at the peripheral component, which type of read request to transmit to the host computer. In this embodiment, the type of read request is selected such that only a desired portion of the data will be prefetched and stored in memory of the host computer. The peripheral component then transmits the read request to the host computer such that the peripheral component has access to the portion of the data. In this invention, the portion of the data is selected such that when stored in the memory of the host computer, the portion of the data will end on a boundary of the memory. Then, the peripheral component reads the portion of the data which is stored in the memory of the host computer. In so doing, the present invention minimizes CPU overhead associated with prefetching data in response to a read request from a peripheral component.

30 Claims, 7 Drawing Sheets

SYSTEM FOR TRANSFERRING LENGTH ROUND DOWN TO CACHE LINE MULTIPLE CAPABLE TO DETERMINE TYPE OF READ REQUEST WHICH SELECTS AND READS PORTION OF PREFETCHED DATA IN MEMORY

TECHNICAL FIELD

The present invention generally pertains to the field of computer networking. More particularly, the present invention is related to the ability of a peripheral component to access and storing data into cache memory of a host computer device.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures in the industry. The PCI bus was developed to provide a high speed, low latency bus architecture from which a large variety of systems could be developed.

Prior Art FIG. 1 shows a typical PCI bus architecture 100. PCI bus architecture 100 is comprised of a CPU 102, main memory 104, cache memory 105 all of which are coupled to a host PCI bridge containing arbiter 106 (hereafter arbiter 106) through a CPU local bus 108 and memory buses 110a and 110b, respectively. A PCI bus 112 is coupled to arbiter 106, and PCI bus 112 is further coupled to each of plurality of PCI agents 114, 116, 118, 120, 122, 124. Note that peripheral component 124 of Prior Art FIG. 1 is a NIC.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, for example, interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transfer.

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates it transaction (e.g., data transfer) with a "target" or slave device (e.g., main memory 104). When the data transaction is complete, the PCI agent relinquishes ownership of the PCI bus, allowing arbiter 106 to reassign PCI bus 112 to another requesting PCI agent.

Thus, only one data transaction can take place on a PCI bus at any given time. In order to maximize the efficiency and data transfer bandwidth of PCI bus 112, PCI agents 114–124 follow a definitive set of protocols and rules. These protocols are designed to standardize the method of accessing, utilizing, and relinquishing PCI bus 112, so as to maximize its data transfer bandwidth. The PCI bus protocols and specifications are set forth in an industry standard PCI specification (e.g., PCI Specification—Revision 2.1). Where each of PCI agents 114–124 are high performance, well designed devices, data transfer rates of up to 528 Mbytes per second can be achieved (e.g., PCI bus 112 operating at 66 MHz).

The NIC, like other peripheral component devices, requires a device driver which controls the physical functions of the NIC and coordinates data transfers between the NIC and the host operating system. An industry standard for interfacing between the device driver and the host operating system is known as the Network Device Interface Specification, or NDIS, which is developed by Microsoft Corporation of Redmond, Washington. The operating system layer implementing the NDIS interface is generally known as an NDIS wrapper. Functionally, the NDIS wrapper arbitrates the control of the device driver between various application programs and provides temporary storage for the data packets.

During typical operation, a peripheral component will need to access data stored in the host computer. In one type of operation, the peripheral component will read data stored in the cache memory of the host computer. In such a read operation, the peripheral component issues a read request to the host computer. In a conventional prior art read operation, the peripheral component will request to read as much of a given type of data as is present in the host computer. In another typical operation, the peripheral component writes information to the memory of the host computer.

Upon receiving the read request, the host computer typically performs a prefetch operation. Specifically, in a conventional prior art prefetch operation the memory subsystem, controlled by the CPU of the host computer, transfers the requested data from system memory of the host computer to cache memory of the host computer. For example, in a conventional prefetch operation, CPU 102 of Prior Art FIG. 1 would transfer data, which a peripheral component (114–124) has requested to read, from system memory 104 to cache memory 105.

In most PCI-based systems, CPU controlled prefetching operations are based on memory line boundaries, such as, cache line boundaries. That is, in conventional operations such as memory read (MR), memory read line (MRL), and memory read multiple (MRM) operations, data is prefetched from a starting address up to a cache line. These conventional prefetch operations have been tailored such that they require minimal CPU overhead and utilization. Additionally, such conventional memory boundary based transfer operations have been designed to provide the most efficient transfer of data between system and cache memory.

Conventional peripheral components, however, simply request to read whatever amount of data is necessary. As a result, in conventional systems, the CPU must account for the fact that the requested data will not occupy an integer number of lines of cache memory. For example, the CPU must write extraneous data into unused portions of a cache line. This, accommodation for data transfers which are not integers of a cache line introduces additional CPU overhead and increases CPU utilization in conventional systems.

Thus, a need exists for a system and method which minimizes the CPU overhead associated with data transfers between a peripheral component and the memory of a host computer system. A further need exists for a system and method which takes advantage of a PCI-based system's inherent use of memory line sizes and boundaries during data transfers.

DISCLOSURE OF THE INVENTION

The present invention provides a system and method which minimizes the CPU overhead associated with data transfers between a peripheral component and the memory of a host computer system. The present invention further provides a system and method which takes advantage of a PCI-based system's inherent use of memory line sizes and boundaries during data transfers. The above accomplishments are achieved with a system and method which issues a read request which rounds down the length of data being transferred such that the data ends on a memory boundary.

Specifically, in one embodiment of the present invention, a peripheral component such as, for example, a network interface card receives information from a peripheral component driver, such as, for example, a network interface card driver. In this embodiment, the information triggers the peripheral component to transmit a read request to the host computer such that the peripheral component can access data present at the host computer. Next, the peripheral component determines from the information received at the peripheral component, which type of read request to transmit to the host computer. In this embodiment, the type of read request is selected such that only a desired portion of the data will be prefetched and stored in memory of the host computer. The peripheral component then transmits the read request to the host computer such that the peripheral component has access to the portion of the data. In this invention, the portion of the data is selected such that when stored in the memory of the host computer, the portion of the data will end on a boundary of the memory. Then, the peripheral component reads the portion of the data which is stored in the memory of the host computer. In so doing, the present invention minimizes CPU overhead associated with prefetching data in response to a read request from a peripheral component. In one embodiment of the present invention, a peripheral component driver such as, for example, a network interface card driver receives a request from a peripheral component, such as, for example, a network interface card, to transfer data from the peripheral component to memory of the host computer. The data to be transferred requires a first block of memory in the host computer wherein the first block of the memory has a first size. The present embodiment then transfers a second block of memory in the host computer to receive the data from the peripheral component. In the present invention, the second block of memory has a second size which is smaller than the first size. Additionally, the second block of memory comprises an integer unit of the memory. In so doing, the present invention minimizes CPU overhead associated with data transfers between a peripheral component and the memory of a host computer. The present invention also reduces latency associated with data transfers between a peripheral component and the memory of a host computer.

In another embodiment, the present invention includes the steps of the above-described embodiment and includes additional steps. Specifically, the present embodiment further performs the steps of transmitting a second read request to the host computer. In so doing, the present embodiment allows the peripheral component to access any remaining portion of the data which was not included in the first portion of the data. In this embodiment, the present invention then reads the remaining portion of the data.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Figure 1:
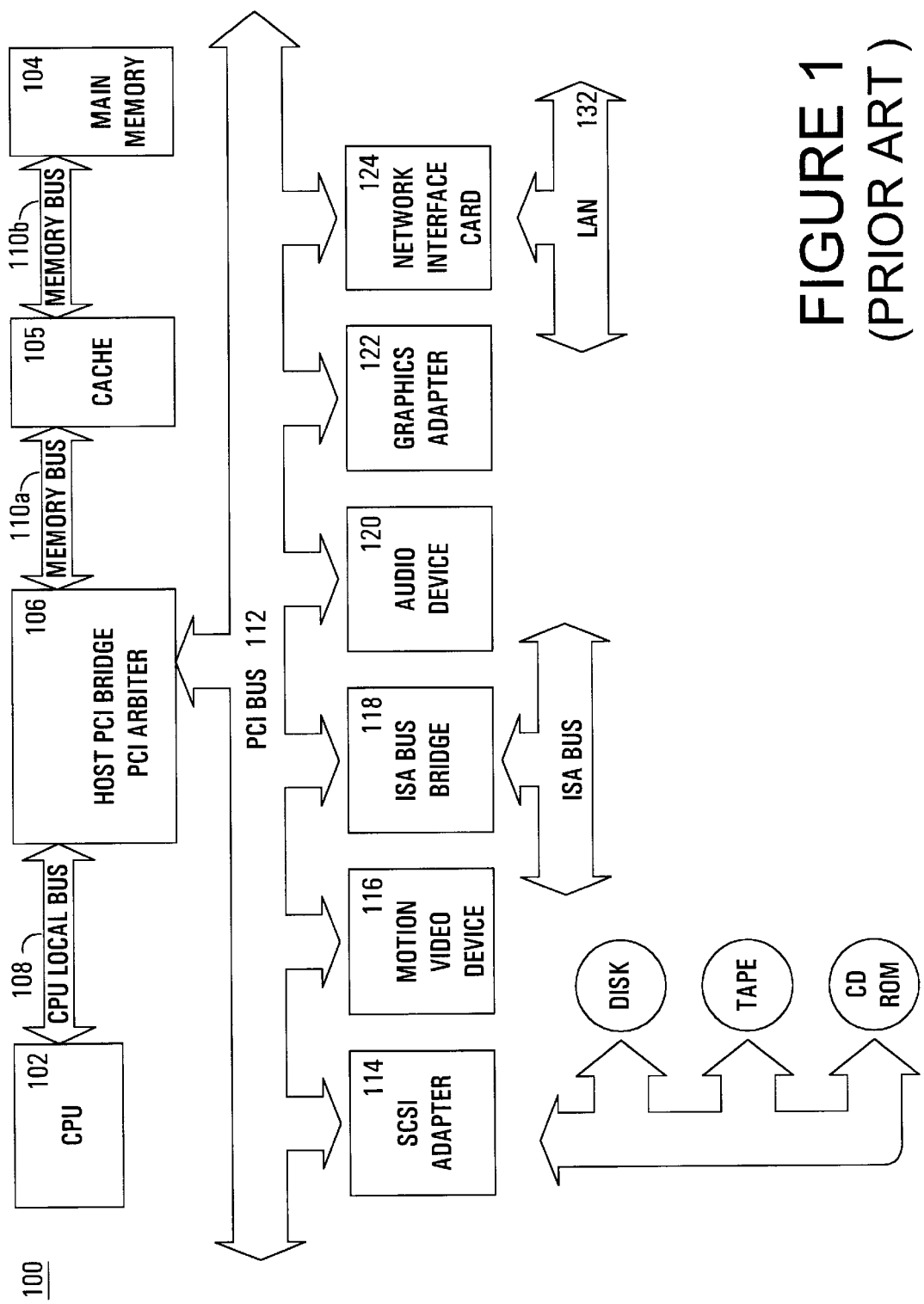
FIG. 1 is a schematic diagram of a typical PCI bus architecture.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "determining", "requesting", "reading" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 2:
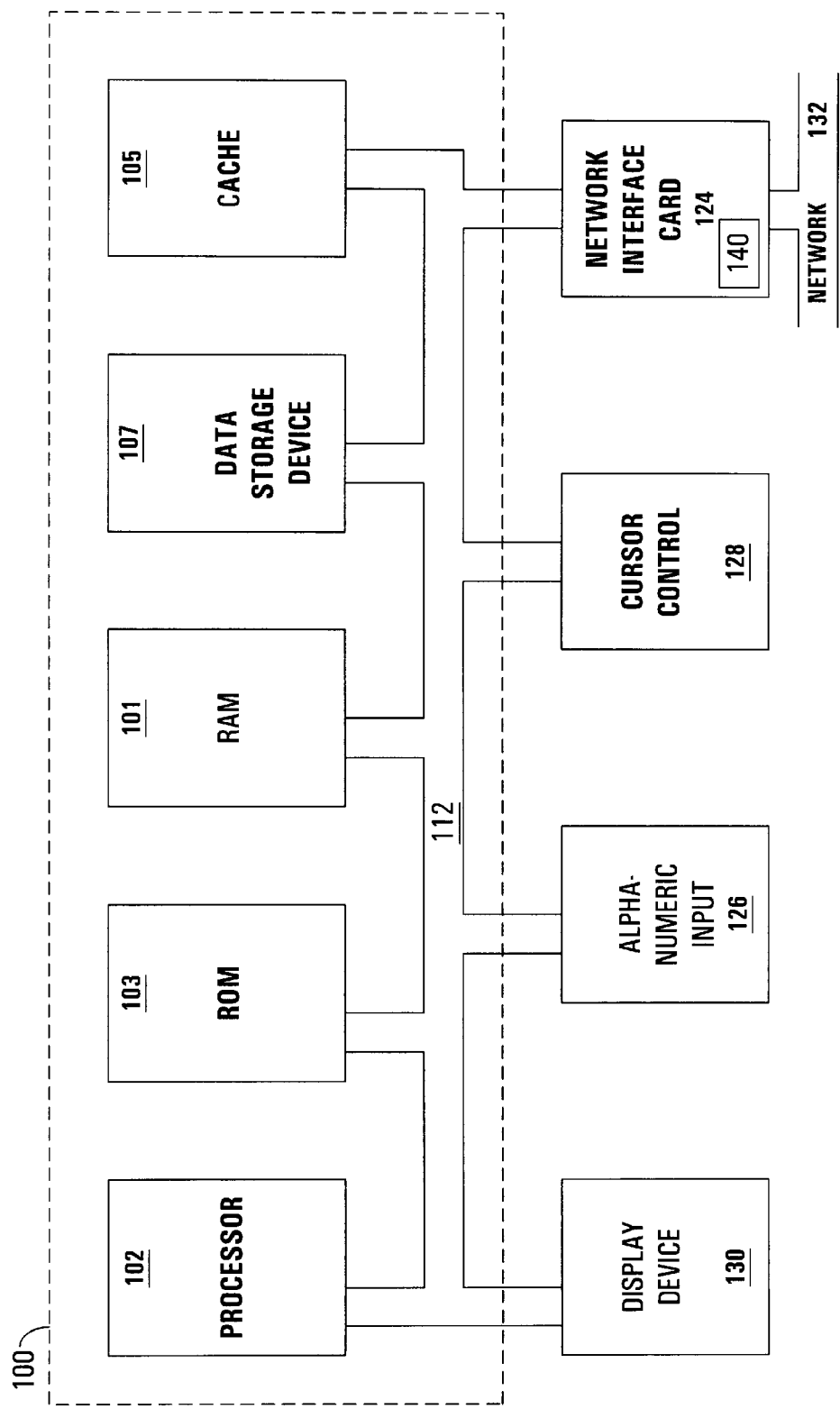
FIG. 2 is a schematic diagram of an exemplary computer system used to perform steps of the present method in accordance with one embodiment of the present invention.

With reference now to FIG. 2, portions of the present method and system are comprised of computer-readable and computer-executable instructions which reside, for example, in computer-usable media of a computer system. FIG. 2 illustrates an exemplary computer system 100 in more detail than is shown in Prior Art FIG. 1. The computer system 100 is used in combination with a peripheral component to perform the present method in accordance with one embodiment of the present invention. It is appreciated that system 100 of FIG. 2 is exemplary only and that the present invention can operate within a number of different computer systems including general purpose networked computer systems, embedded computer systems, and stand alone computer systems. Additionally, computer system 100 of FIG. 2 is well adapted having computer readable media such as, for example, a floppy disk, a compact disc, and the like coupled thereto. Such computer readable media is not shown coupled to computer system 100 in FIG. 2 for purposes of clarity.

Furthermore, in the following discussion, a computer system such as computer system 100 of FIG. 2 is described for purposes of clarity. However, in embodiments of the present invention, portions of the present method and system are comprised of computer-readable and computer-executable instructions which are performed by NIC 124. That is, in the present embodiment, many steps of the present invention are not performed by the processor of the host computer, but are instead performed by, for example, a NIC ASIC (application specific integrated circuit) residing on NIC 124.

System 100 of FIG. 2 includes a PCI address/data bus 112 for communicating information, and a central processor unit 102 coupled to bus 112 for processing information and instructions. Central processor unit 102 may be an 80×86-family microprocessor. System 100 also incudes data storage features such as a computer usable volatile memory 101, e.g. random access memory (RAM), coupled to bus 112 for storing information and instructions for central processor unit 102, computer usable non-volatile memory 103, e.g. read only memory (ROM), and cache memory 105 coupled to bus 112 for storing static information and instructions for the central processor unit 102, and a data storage unit 107 (e.g., a magnetic or optical disk and disk drive) coupled to bus 112 for storing information and instructions. It will be understood that in some embodiments, ROM 103, RAM 101, cache memory 105, and data storage unit 107, or some combination thereof, will comprise main memory 104 of Prior Art FIG. 1. System 100 of the present invention also includes an optional alphanumeric input device 126 including alphanumeric and function keys is coupled to bus 112 for communicating information and command selections to central processor unit 102. System 100 also optionally includes a cursor control device 128 coupled to bus 112 for communicating user input information and command selections to central processor unit 102. System 100 of the present embodiment also includes an optional display device 130 coupled to bus 112 for displaying information.

Referring still to FIG. 2, optional display device 130 of FIG. 2, may be a liquid crystal device, cathode ray tube, or other display device suitable for creating graphic images and alphanumeric characters recognizable to a user. Optional cursor control device 128 allows the computer user to dynamically signal the two dimensional movement of a visible symbol (cursor) on a display screen of display device 130. Many implementations of cursor control device 128 are known in the art including a trackball, mouse, touch pad, joystick or special keys on alphanumeric input device 126 capable of signaling movement of a given direction or manner of displacement. Alternatively, it will be appreciated that a cursor can be directed and/or activated via input from alphanumeric input device 126 using special keys and key sequence commands. The present invention is also well suited to directing a cursor by other means such as, for example, voice commands. A more detailed discussion of the method and system embodiments of the present invention are found below.

With reference still to FIG. 2, significantly, a network interface card (NIC) 124 coupled to bus 102 is connected to a network 120 and controls the flow of information over network 132. Data packets, such as Ethernet packets, that are incoming arrive at NIC 124 via network 132 and are stored in FIFO memory 140 of NIC 124 before being transferred to other hardware and software of computer system 100. A more detailed discussion of NIC 124 in furtherance of the present invention is found below.

Figure 3:
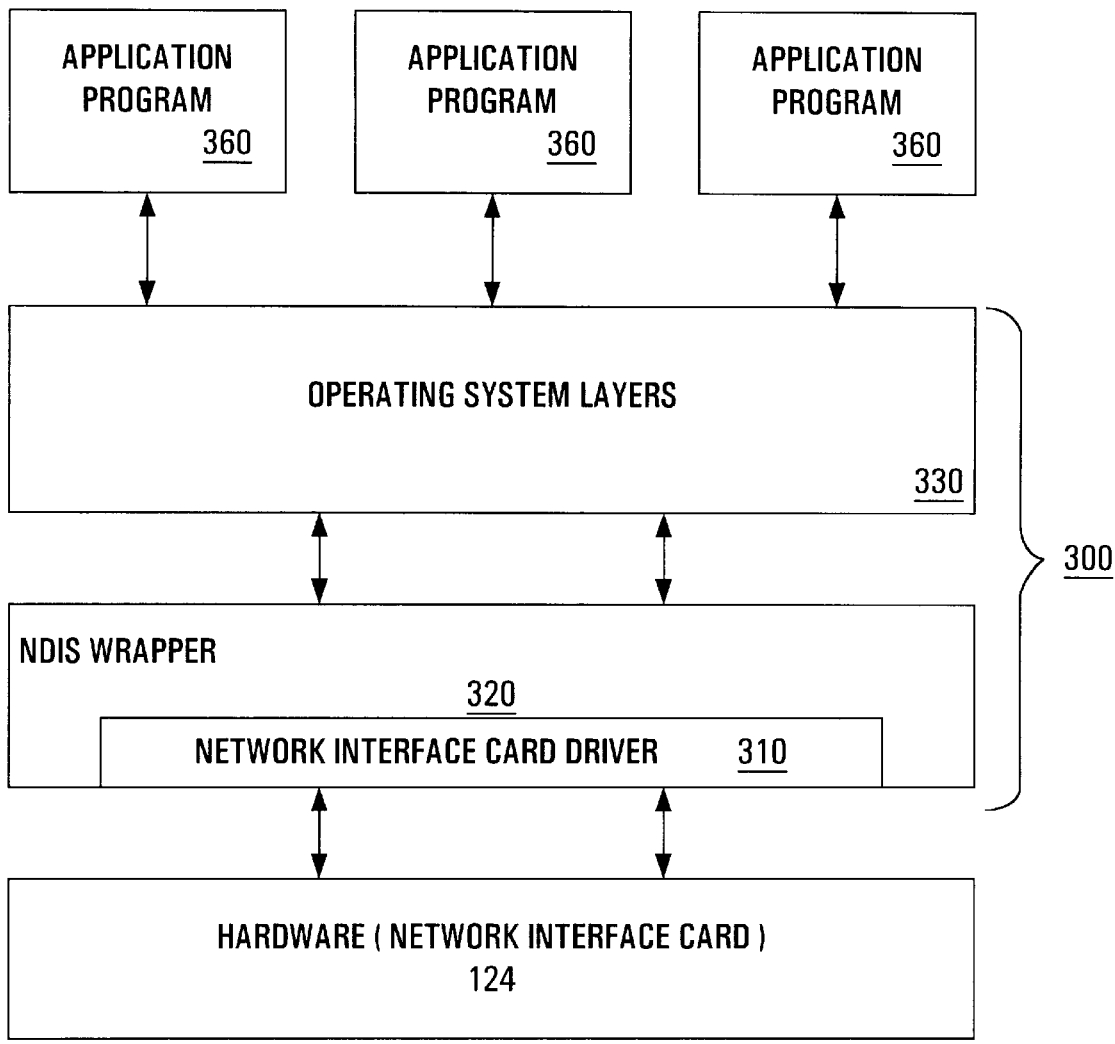
FIG. 3 is a schematic diagram of different operating layers associated with the computer system as illustrated in FIG. 2 in furtherance of one embodiment of the present invention.

Referring next to FIG. 3, a block diagram that represents the different layers of a host operating system 300 operable on computer system 100 of FIG. 2 is shown. Host operating system 300 includes a network interface card driver 310 that operates NIC 124 and moves data packets between NIC 124 and other hardware and software of computer system 100. Implemented directly above network interface card driver 310 is a network device interface specification (NDIS) wrapper 320. FIG. 3 further includes a schematic representation of operating system layers 330. NDIS wrapper 320 primarily arbitrates the control of network interface card driver 310 between various application programs, typically shown as 360.

Figure 4:
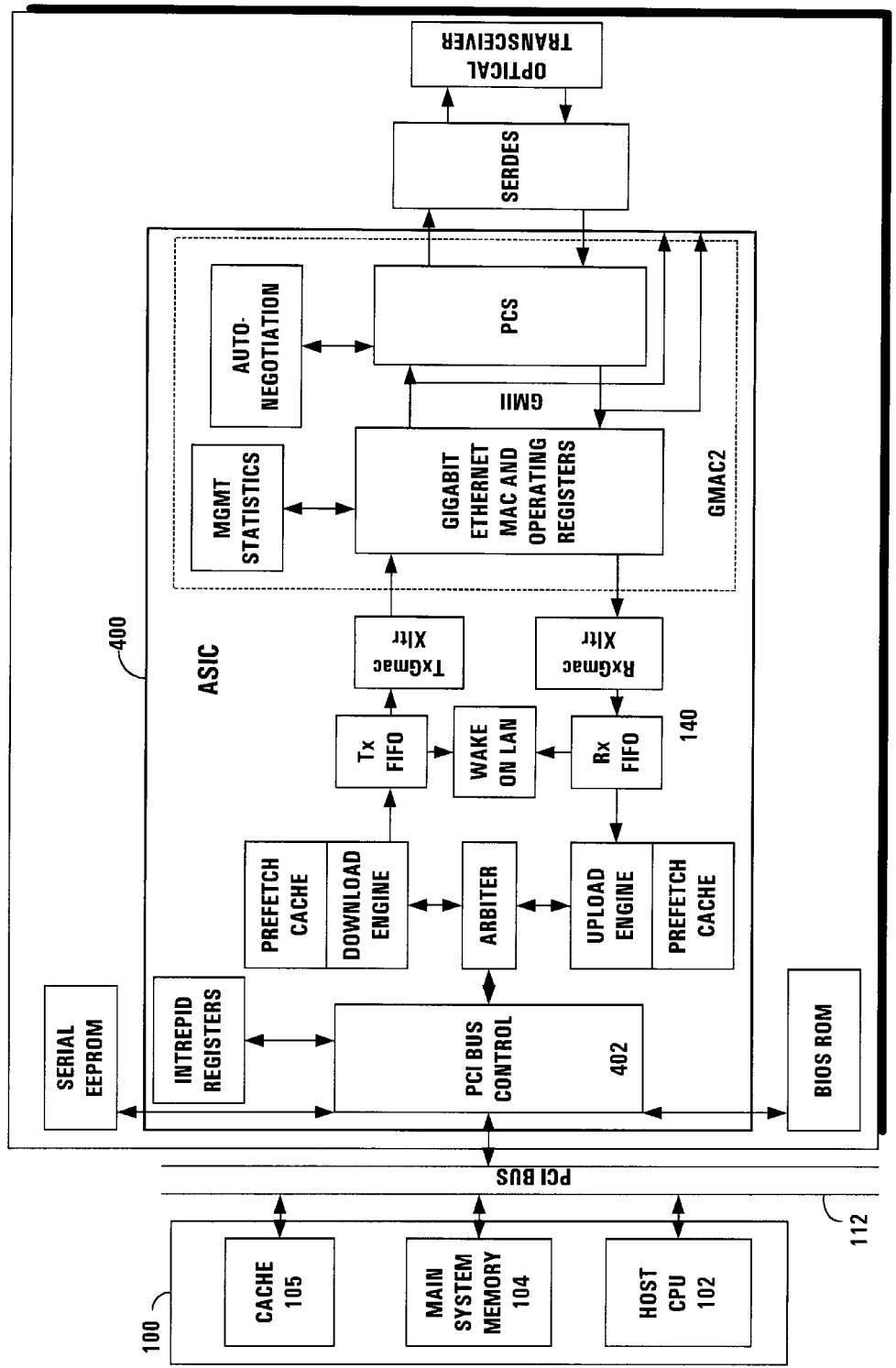
FIG. 4 is a schematic diagram of a host computer system having a network interface card coupled thereto in accordance with one embodiment of the present claimed invention.

Referring now to FIG. 4, a schematic diagram of a host computer system 100 having a network interface card 124 coupled thereto is shown. In the embodiment of FIG. 4, network interface card 124 includes a network interface card ASIC (application specific integrated circuit) 400, which contains various components and features. Although such a specific implementation is shown in the embodiment of FIG. 4, the present invention is also well suited to an embodiment having various other components and features.

GENERAL DESCRIPTION OF THE PRESENT INVENTION

Figure 5:
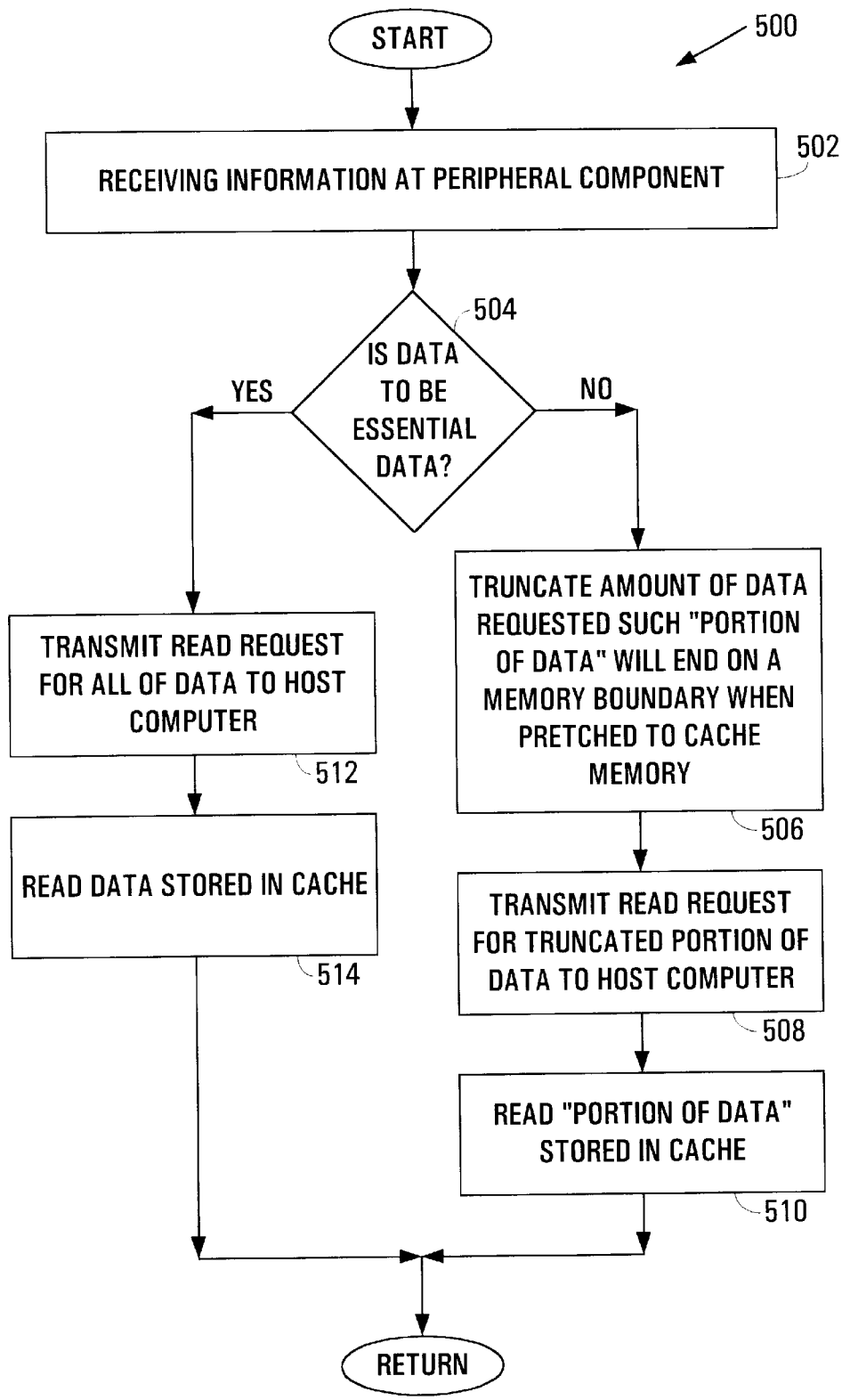
FIG. 5 is a flow chart of steps performed in one implementation of a method in accordance with one embodiment of the present claimed invention.

With reference next to FIG. 5, a flow chart 500 of exemplary steps used by the present invention is shown. Flow chart 500 includes processes of the present invention which, in one embodiment, performed by NIC 124 under the control of computer-readable and computer-executable instructions. The computer-readable and computer-executable instructions reside, for example, in data storage features such as computer usable volatile memory 101, computer usable non-volatile memory 103 of FIG. 2, and/or memory on NIC 124. The computer-readable and computer-executable instructions are used to control or operate in conjunction with, for example, central processing unit 102, ASIC 400 of NIC 124, host operating system 300, and network device driver 210. Although specific steps are disclosed in flow chart 500 of FIG. 5, such steps are exemplary. That is, the present invention is well suited to performing various other steps or variations of the steps recited in FIG. 5. Furthermore, although the following discussion specifically describes "rounding-down" of a read operation, the present invention is also well suited to "rounding-down" of a write operation. In such an embodiment, the write operation is performed such that information written to the memory of the host computer will employ defined memory boundaries.

In step 502 of FIG. 5, in one embodiment of the present invention, a peripheral component such as, for example, network interface card (NIC) 124 receives information from, for example, a peripheral component driver such as network interface card driver 310. In the present invention, the information is intended to trigger NIC 124 to transmit a read request to host computer 100 such that NIC 124 will access data present at host computer 100. In the following description of embodiments of the present invention, the peripheral component driver is a network interface card driver. Additionally, in the following description of embodiments of the present invention, the peripheral component is a network interface card which is removably coupleable to the host computer. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver. Additionally, the present invention is well suited to use in an embodiment in which the peripheral component is, for example, a rate controller, a small computer system interface (SCSI) controller, a graphics card, and the like.

With reference still to step 502 of FIG. 5, in the present embodiment, network interface card 124 receives the information which is intended to trigger the generation of the read request over PCI bus 112. Additionally, any read request generated by NIC 124 will be sent to the host computer over PCI bus 112 using bus control logic 402 of FIG. 4. It will be understood that in the embodiment of FIG. 4, PCI bus control logic 402 is employed to control access to and use of PCI bus 112. Although NIC ASIC 400 is configured as shown in FIG. 4, it will be understood that the present invention is also well suited to various other configurations for NIC ASIC 400. Additionally, in the following description of the present embodiments, NIC 124 generates request for and communicates with host computer 100 via PCI bus 112. Although the present embodiments specifically recite the use of a PCI bus, the present invention is also well suited to an embodiment employing various other busses. That is, the present invention is well suited to an embodiment in which the bus is, for example, a USB (universal serial bus), an ISA (industry standard architecture) bus, a SCSI (small computer systems interface) bus, an IEEE (Institute of Electronics and Electrical Engineers, Inc.) 1394 serial bus, an EISA (extended industry standard architecture) bus, and the like.

Referring still to step 504, in the present embodiment, NIC 124 determines, from the information received at step 502, which type of read request to transmit to host computer 100. Typically, information such as that received in step 502 instructs a conventional NIC to generate a request to read a specified amount of data. Specifically, although the information received in step 502 may trigger a conventional NIC to generate a request to read a first amount of data, the present invention intelligently determines just how much of the data will actually be requested in the read request.

Referring still to step 504, in the present embodiment, NIC 124 determines the type of data to be read and the quantity of data to be read. Specifically, in the present embodiment, NIC 124 determines whether the information to be read is essential data or non-essential data. For purposes of the present application, nonessential data refers to data which does not necessarily have to be read by or transferred to NIC 124 in its entirety, and concurrently, in order to meet its intended objectives. For example, in the present embodiment, non-essential data includes data such as, for example, control and status information. Such control and status information includes, for example, packet descriptors, requests for status returns, and various other control information passed to NIC 124. In the present application, essential information includes information such as transfer packets and various other information which is quickly used by NIC 124. The present embodiment also determines the quantity of data which the information received in step 502 indicates should be read. At step 504, if the present embodiment determines that the data to be read is non-essential, the present embodiment proceeds to step 506. On the other hand, if at step 504, the present embodiment determines that the data to be read is essential, the present embodiment proceeds to step 512.

Referring now to step 506, having determined at step 504 that the data to be read is non-essential, the present embodiment "rounds down" or truncates the amount of data requested in the read request. That is, the present embodiment generates a read request for only a portion of the data which is referred to in the information received at step 502. Furthermore, the portion of the data is selected such that when the portion of the data is prefetched and stored in, for example, cache memory of the host computer, the portion of the data will end on a cache line boundary.

Figure 6:
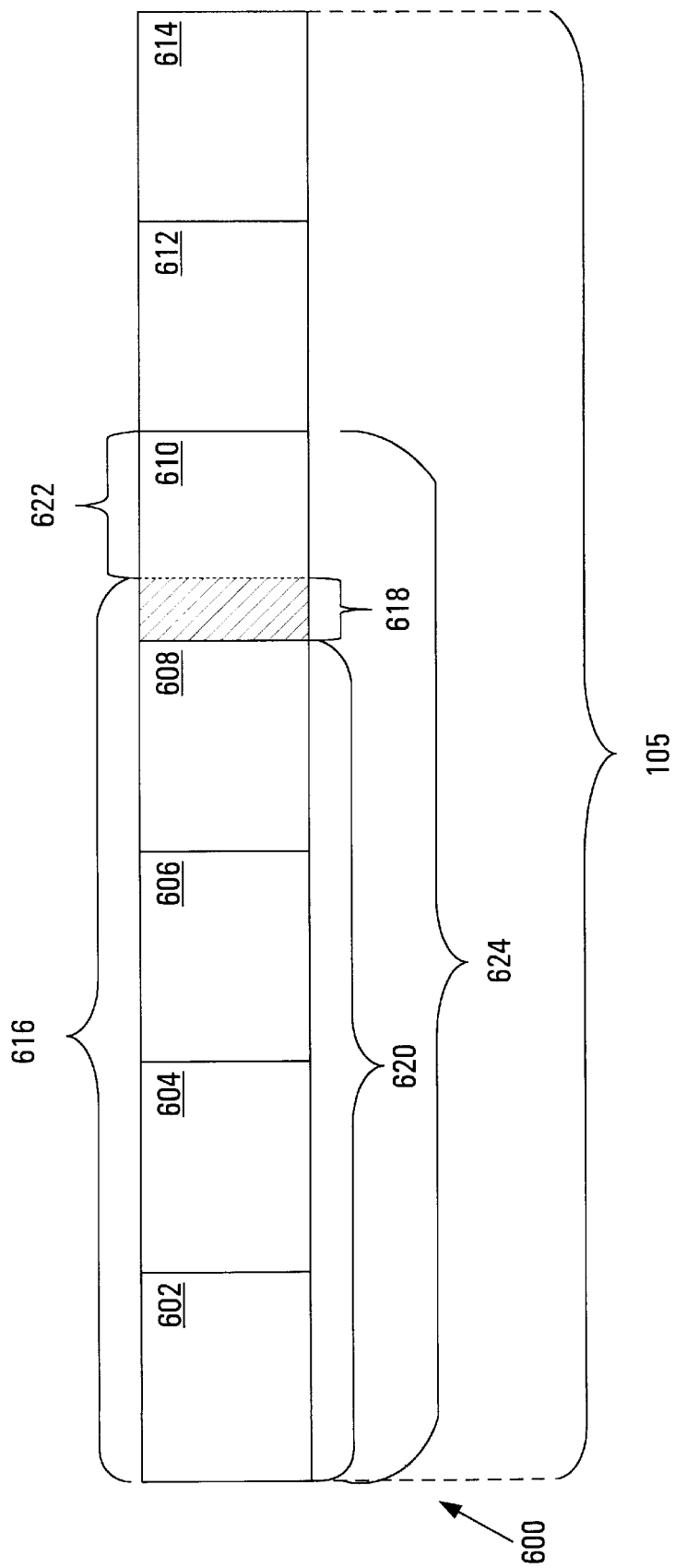
FIG. 6 is a physical representation of memory spaces comprising cache memory of a host computer in accordance with one embodiment of the present claimed invention.

Referring now to FIG. 6, a physical representation of memory spaces comprising cache memory 105 of host computer 100, both of FIGS. 1, 2, and 4 is shown. As depicted in FIG. 6, cache memory 105 is comprised of discrete units 602, 604, 606, 608, 610, 612, and 614 (hereinafter units 602–614) of memory space. It will be understood, that units 602–614 comprise, for example, lines of cache memory. In the embodiment of FIG. 6, each of units 602–614 comprises 32 bytes of memory. Although such a specific representation is depicted in FIG. 6, such an arrangement is exemplary. That is, the present invention is well suited to an embodiment in which cache memory 105 has a different number of discrete units, and the present embodiment is also well suited to an embodiment in which the discrete units are comprised of a greater or lesser amount of memory space. Furthermore, although the following discussion specifically describes transferring data from system/main memory 104 of the host computer to cache memory 105, the present invention is also well suited for use with an embodiment in which the data is to be transferred to memory other than cache memory 105.

Referring still to FIG. 6, in one embodiment, at step 502 of FIG. 5, NIC 124 receives information which is intended to trigger NIC 124 to generate a read request for data which will occupy a first block of memory having a first size. In this embodiment, the data, if prefetched in its entirety to cache 105, will occupy a first block of memory shown as block 624. That is, in order to prefetch and store the data, in its entirety, the entire memory (e.g. the entire cache line) of units 602 604, 606, 608 and 610 will be required. In the embodiment of FIG. 6, portion 618 comprises 2 bytes of cache memory. Because read operations such as MR, MRL, and MRM operations are inherently cache line based, in many conventional operations, the memory subsystem of the host computer 100, will write extraneous data into the unused portion 622 of unit 610 during the prefetch operation. Such extra activity introduces unwanted extra CPU utilization during the prefetch operation.

With reference again to FIG. 5, as mentioned above, in step 506 of the present embodiment, NIC 124 "rounds down" or truncates the amount of data requested in the read request. In this embodiment, NIC 124 request to read only a portion of data 616 of FIG. 6. That is, NIC 124 issues a read request for portion 620 of the data. In the present invention, portion 620 of data is smaller than the entirety 616 of the data. Additionally, portion 620 is comprised of an integer number of cache memory units. That is, when prefetched from the main memory of the host computer, portion 620 is comprised of 5 complete memory units, 602, 604, 606, 608, and 610. As a result, the present embodiment eliminates the need for the memory subsystem of the host computer to write unnecessary data into unused portion of the cache memory. More particularly, the present embodiment, takes advantage of the fact that many conventional prefetch operations are cache boundary based. Hence, the present embodiment, minimizes CPU utilization and overhead during data prefetch operations, and makes efficient use of the cache boundary protocol in PCI-based systems. Additionally, the present embodiment does not waste valuable cache space of the host computer.

Referring still to step 506 although only a portion of non-essential data is requested in the present embodiment, the performance of NIC 124 will not be diminished. That is, NIC 124 must process the non-essential data read from cache 105 of host computer 100. As will be described in detail below in conjunction with the embodiment of FIG. 7, in many instances, before NIC 124 has finished processing the first portion of the data, host computer 100 will instruct NIC 124 to generate a second read request. In another example, NIC 124 will transfer the remaining data, without being prompted by the host computer, once it has finished processing the first portion of the data. As a result of the second read request, the remaining portion of the data will be transferred to NIC 124. Thus, even before NIC 124 is finished processing the first "truncated" portion of the data, the remaining/second portion of the data will be read by NIC 124.

At step 508, the present embodiment transmits the read request for the truncated portion of the data to the host computer. As mentioned above, in the present embodiment, the read request is submitted via PCI bus 112.

Finally, at step 510, the present embodiment then reads the truncated or rounded down portion of the data which has been prefetched by the memory subsystem of the host computer to cache memory 105.

If at step 504, the present embodiment determined that the data to be read is essential, the present embodiment proceeds to step 512.

At step 512, the present embodiment transmits the read request for the entire quantity of the data to the host computer. As mentioned above, in the present embodiment, the read request is submitted via PCI bus 112.

At step 514, the present embodiment then reads the entire portion of the data which has been prefetched by the memory subsystem of the host computer to cache memory 105.

Figure 7:
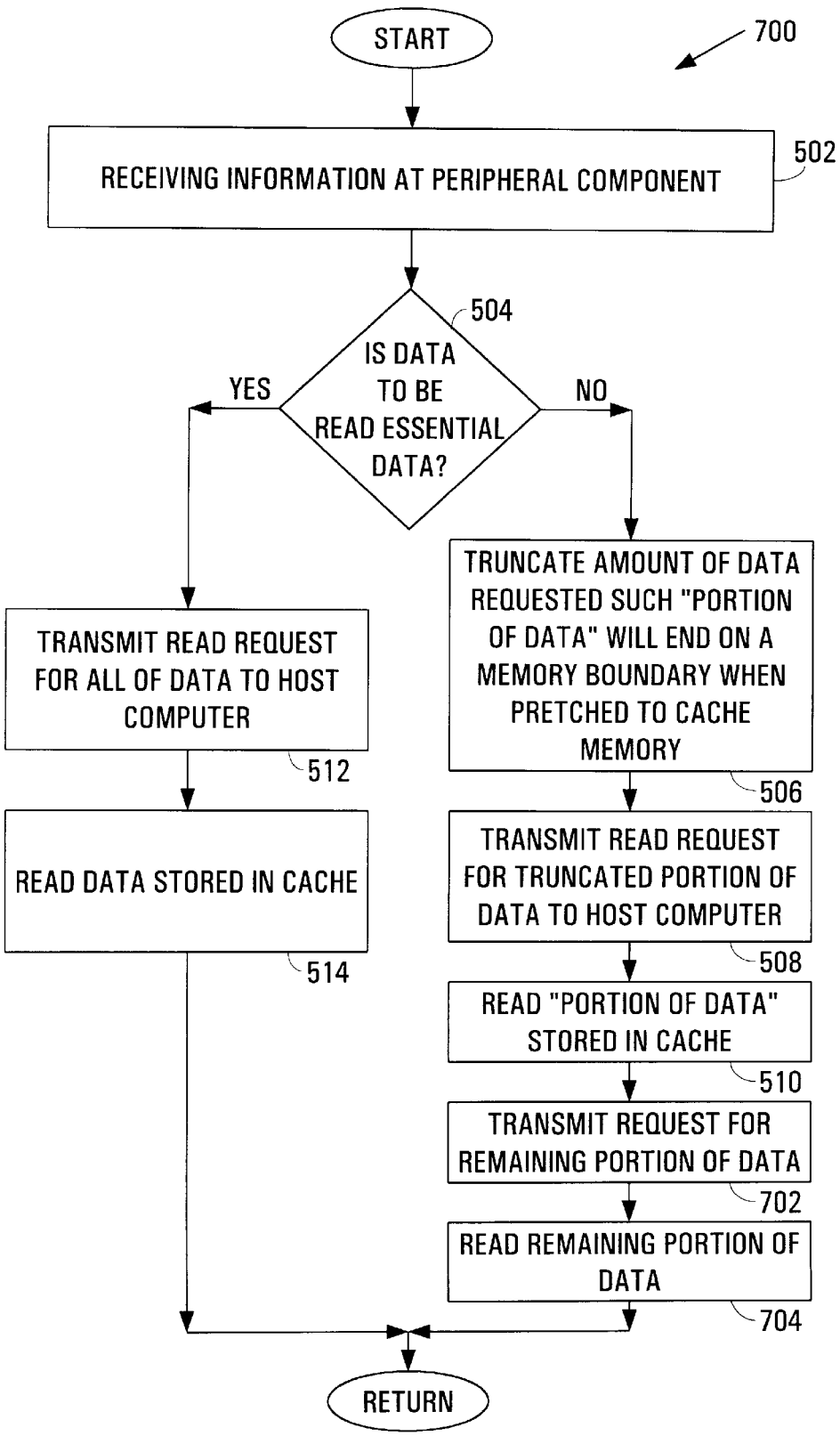
FIG. 7 is a flow chart of steps performed in another implementation of a method in accordance with one embodiment of the present claimed invention.

With reference now to FIG. 7, a flow chart 700 of exemplary steps used by the present invention is shown. The embodiment of FIG. 7 includes steps 502–514 which are described in detail above. However, in this embodiment, at step 510 after reading the truncated portion of the data from cache memory 105 of the host computer, the present invention proceeds to step 702. At step 702, the present embodiment transmitting a second read request to the host computer. The second read request is for any remaining portion of the data which was not included in the first truncated portion of the data. In so doing, the present embodiment ensures that all of the non-essential data is read by NIC 124. Again, in many instances, before NIC 124 has finished processing the first portion of the data, host computer 100 will instruct NIC 124 to generate a second read request. That is, the read request of step 702 may be triggered by host computer 100 even before NIC 124 has finished processing the first portion of the data. As a result of the second read request, the remaining portion of the data is transferred to NIC 124.

At step 704, the present embodiment then reads the remaining portion of the data which has been prefetched by the memory subsystem of the host computer to cache memory 105.

Thus, the present invention provides a system and method which minimizes the CPU overhead associated with data transfers between a peripheral component and the memory of a host computer system. The present invention further provides a system and method which takes advantage of a PCI-based system's inherent use of memory line sizes and boundaries during data transfers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

We claim:

1. A computer implemented method of efficiently transferring data between a host computer and a peripheral component removably coupled to said host computer, said method comprising the steps of:
   a) receiving information at said peripheral component wherein said information triggers said peripheral component to transmit a read request to said host computer such that said peripheral component can access data present at said host computer;
   b) determining from said information received at said peripheral component, which type of said read request to transmit to said host computer, said type of said read request selected such that a portion of said data is prefetched and stored in memory of said host computer;
   c) transmitting said read request to said host computer such that said peripheral component has access to said portion of said data, said portion of said data stored in said memory of said host computer such that said portion of said data stored in said memory ends on a boundary of said memory; and
   d) reading said portion of said data stored in said memory of said host computer.

2. The computer implemented method as recited in claim 1 wherein step a) of said method for efficiently transferring data between a peripheral component and a host computer further comprises receiving said information at a network interface card.

3. The computer implemented method as recited in claim 2 wherein step a) of said method for efficiently transferring data between a peripheral component and a host computer further comprises receiving said information at said network interface card from a network interface card driver.

4. The computer implemented method of efficiently transferring data between a host computer and a peripheral component as recited in claim 1 wherein said information indicates the type of said data to be read by said peripheral component and wherein said information further indicates the quantity of said data to be read by said peripheral component.

5. The computer implemented method as recited in claim 1 wherein step b) of said method for efficiently transferring data between a peripheral component and a host computer further comprises determining from said information received at said peripheral component whether said data to be read is essential or non-essential data.

6. The computer implemented method as recited in claim 1 wherein step b) of said method for efficiently transferring data between a peripheral component and a host computer further comprises determining from said information received at said peripheral component, which type of said read request to transmit to said host computer, said type of said read request selected such that said portion of said data is prefetched and stored in cache memory of said host computer.

7. The computer implemented method of efficiently transferring data between a host computer and a peripheral component as recited in claim 1 wherein said read request truncates said data prefetched to said memory of said host computer such that said peripheral component accesses only said first portion of said data.

8. The computer implemented method of efficiently transferring data between a host computer and a peripheral component as recited in claim 1 further comprising the steps of:
   e) transmitting a second read request to said host computer such that said peripheral component accesses any remaining portion of said data which was not included in said first portion of said data; and
   f) reading said remaining portion of said data.

9. A computer system comprising:
   a processor;
   an address/data bus coupled to said processor;
   a computer readable memory coupled to communicate with said processor, said processor for performing a method of efficiently transferring data between a host computer and a peripheral component removably coupled to said host computer, said method comprising the steps of:
   a) receiving information at said peripheral component wherein said information triggers said peripheral component to transmit a read request to said host computer such that said peripheral component can access data present at said host computer;
   b) determining from said information received at said peripheral component, which type of said read request to transmit to said host computer, said type of said read request selected such that a portion of said data is prefetched and stored in memory of said host computer;
   c) transmitting said read request to said host computer such that said peripheral component has access to said portion of said data, said portion of said data stored in said memory of said host computer such that said portion of said data stored in said memory ends on a boundary of said memory; and
   d) reading said portion of said data stored in said memory of said host computer.

10. The system of claim 9 wherein step a) of said method for efficiently transferring data between a peripheral component and a host computer further comprises receiving said information at a network interface card.

11. The system of claim 10 wherein step a) of said method for efficiently transferring data between a peripheral component and a host computer further comprises receiving said information at said network interface card from a network interface card driver.

12. The system of claim 9 for efficiently transferring data between a host computer and a peripheral component wherein said information indicates the type of said data to be read by said peripheral component and wherein said information further indicates the quantity of said data to be read by said peripheral component.

13. The system of claim 9 wherein step b) of said method for efficiently transferring data between a peripheral component and a host computer further comprises determining from said information received at said peripheral component whether said data to be read is essential or non-essential data.

14. The system of claim 9 wherein step b) of said method for efficiently transferring data between a peripheral component and a host computer further comprises determining from said information received at said peripheral component, which type of said read request to transmit to said host computer, said type of said read request selected such that said portion of said data is prefetched and stored in cache memory of said host computer.

15. The system of claim 9 for efficiently transferring data between a host computer and a peripheral component wherein said read request truncates said data prefetched to said memory of said host computer such that said peripheral component accesses only said first portion of said data.

16. The system of claim 9 wherein said method for efficiently transferring data between a host computer and a peripheral component further comprises the steps of:
  e) transmitting a second read request to said host computer such that said peripheral component accesses any remaining portion of said data which was not included in said first portion of said data; and
  f) reading said remaining portion of said data.

17. A computer-usable medium having computer-readable program code embodied therein for causing a computer system to perform the steps of:
  a) receiving information at said peripheral component wherein said information triggers said peripheral component to transmit a read request to said host computer such that said peripheral component can access data present at said host computer;
  b) determining from said information received at said peripheral component, which type of said read request to transmit to said host computer, said type of said read request selected such that a portion of said data is prefetched and stored in memory of said host computer;
  c) transmitting said read request to said host computer such that said peripheral component has access to said portion of said data, said portion of said data stored in said memory of said host computer such that said portion of said data stored in said memory ends on a boundary of said memory; and
  d) reading said portion of said data stored in said memory of said host computer.

18. The computer readable medium as described in claim 17 wherein said computer-readable program code embodied therein causes said computer system to perform step a) wherein step a) further comprises receiving said information at a network interface card.

19. The computer readable medium as described in claim 18 wherein said computer-readable program code embodied therein causes said computer system to perform step a) wherein step a) further comprises receiving said information at said network interface card from a network interface card driver.

20. The computer readable medium as described in claim 17 wherein said computer-readable program code embodied therein causes said computer system to efficiently transfer data between said host computer and said peripheral component and wherein said information indicates the type of said data to be read by said peripheral component and wherein said information further indicates the quantity of said data to be read by said peripheral component.

21. The computer readable medium as described in claim 17 wherein said computer-readable program code embodied therein causes said computer system to perform step b) wherein step b) further comprises determining from said information received at said peripheral component whether said data to be read is essential or non-essential data.

22. The computer readable medium as described in claim 17 wherein said computer-readable program code embodied therein causes said computer system to perform step b) wherein step b) further comprises determining from said information received at said peripheral component, which type of said read request to transmit to said host computer, said type of said read request selected such that said portion of said data is prefetched and stored in cache memory of said host computer.

23. The computer readable medium as described in claim 17 wherein said computer-readable program code embodied therein causes said computer system to efficiently transfer data between said host computer and said peripheral component and wherein said read request truncates said data prefetched to said memory of said host computer such that said peripheral component accesses only said first portion of said data.

24. The computer readable medium as described in claim 17 wherein said computer-readable program code embodied therein causes said computer system to further perform the steps of:
  e) transmitting a second read request to said host computer such that said peripheral component accesses any remaining portion of said data which was not included in said first portion of said data; and
  f) reading said remaining portion of said data.

25. A computer implemented method of efficiently transferring data between a host computer and a peripheral component removably coupled to said host computer, said method comprising the steps of:
  a) receiving information at said peripheral component wherein said information triggers said peripheral component to perform a write operation to said host computer such that said host computer can access data present at said peripheral component;
  b) determining from said information received at said peripheral component, which type of said write operation to perform, said type of write operation selected such that a portion of said data will be written to memory of said host computer;
  c) performing said write operation such that said host computer has access to said portion of said data, said portion of said data written to said memory of said host computer such that said portion of said data written in said memory ends on a boundary of said memory; and
  d) reading said portion of said data written in said memory of said host computer.

26. The computer implemented method as recited in claim 25 wherein step a) of said method for efficiently transferring data between a peripheral component and a host computer further comprises receiving said information at a network interface card.

27. The computer implemented method as recited in claim 26 wherein step a) of said method for efficiently transferring data between a peripheral component and a host computer further comprises receiving said information at said network interface card from a network interface card driver.

28. The computer implemented method of efficiently transferring data between a host computer and a peripheral component as recited in claim 25 wherein said information indicates the type of said data to be written by said peripheral component and wherein said information further indicates the quantity of said data to be written by said peripheral component.

29. The computer implemented method of efficiently transferring data between a host computer and a peripheral component as recited in claim 25 wherein said write operation truncates said data written to said memory of said host computer such that said host computer accesses only said first portion of said data.

30. The computer implemented method of efficiently transferring data between a host computer and a peripheral component as recited in claim 25 further comprising the steps of:

e) performing a second write operation to said memory of said host computer such that said host computer has access to any remaining portion of said data which was not included in said first portion of said data.

* * * * *